US009884598B2

(12) United States Patent
Kaneko et al.

(10) Patent No.: US 9,884,598 B2
(45) Date of Patent: Feb. 6, 2018

(54) BUMPER DEVICE FOR A VEHICLE

(71) Applicants: AISIN SEIKI KABUSHIKI KAISHA, Kariya-shi, Aichi-ken (JP); AISIN KEIKINZOKU KABUSHIKI KAISHA, Imizu-shi, Toyama-ken (JP)

(72) Inventors: Takanobu Kaneko, Kariya (JP); Kiyoichi Kita, Takaoka (JP); Jun Shobo, Himi (JP); Kazutaka Mori, Imizu (JP); Tamaki Obayashi, Toyama (JP)

(73) Assignees: Aisin Seiki Kabushiki Kaisha, Kariya-shi, Aichi-ken (JP); Aisin Keikinzoku Kabushiki Kaisha, Imizu-shi, Toyama-ken (JP)

( * ) Notice: Subject to any disclaimer, the term of this patent is extended or adjusted under 35 U.S.C. 154(b) by 0 days.

(21) Appl. No.: 14/947,223

(22) Filed: Nov. 20, 2015

(65) Prior Publication Data
US 2016/0144812 A1 May 26, 2016

(30) Foreign Application Priority Data
Nov. 21, 2014 (JP) ................. 2014-236210

(51) Int. Cl.
*B60R 19/18* (2006.01)
*B60R 19/22* (2006.01)

(52) U.S. Cl.
CPC .............. *B60R 19/18* (2013.01); *B60R 19/22* (2013.01); *B60R 2019/182* (2013.01); *B60R 2019/1806* (2013.01)

(58) Field of Classification Search
CPC . B60R 19/18; B60R 19/22; B60R 2019/1806; B60R 2019/182

USPC ......................................................... 293/120
See application file for complete search history.

(56) References Cited

U.S. PATENT DOCUMENTS

| 6,058,673 A | 5/2000 | Wycech | |
|---|---|---|---|
| 2013/0127189 A1* | 5/2013 | Brockhoff | B60R 19/18 293/113 |

FOREIGN PATENT DOCUMENTS

| DE | 298 12 843 U 1 | 10/1998 |
|---|---|---|
| JP | 5-210117 B2 | 6/2013 |
| JP | 5210117 | 6/2013 |
| WO | WO 98/21060 | 5/1998 |

(Continued)

OTHER PUBLICATIONS

European Search Report for European Application No. 15195704.0 dated Mar. 29, 2016.

*Primary Examiner* — Joseph D Pape
*Assistant Examiner* — Dana Ivey
(74) *Attorney, Agent, or Firm* — Finnegan, Henderson, Farabow, Garrett & Dunner, LLP

(57) ABSTRACT

A bumper device for a vehicle is arranged on one of a front side and a rear side of a vehicle cabin to extend in a vehicle width direction. The bumper device for a vehicle includes: a tubular portion, which is made of metal and integrally formed so as to have a tubular shape extending in the vehicle width direction; and a reinforcing member, which is formed so as to have a plate-like shape extending in the vehicle width direction along an inner surface of the tubular portion. A foamed resin charged into the tubular portion is foamed to be increased in volume, to thereby fix the reinforcing member inside the tubular portion.

14 Claims, 5 Drawing Sheets

(56) References Cited

FOREIGN PATENT DOCUMENTS

WO      WO 00/41916      7/2000

\* cited by examiner

BUMPER DEVICE FOR A VEHICLE

CROSS REFERENCE TO RELATED APPLICATIONS

This application is based on and claims priority under 35 U.S.C. § 119 to Japanese Patent Application 2014-236210, filed on Nov. 21, 2014, the entire content of which is incorporated herein by reference.

TECHNICAL FIELD

The present disclosure relates to a bumper device for a vehicle.

BACKGROUND DISCUSSION

Hitherto, as described in Japanese Patent No. 5210117, there has been known a bumper device for a vehicle, which is configured to absorb a shock caused when the vehicle collides with an object. The bumper device for a vehicle (bumper reinforcement) includes a tubular portion formed into a tubular shape (hollow shape) extending in a vehicle width direction, and a reinforcing portion inserted into the tubular portion, which is configured to reinforce the tubular portion. The tubular portion has a substantially rectangular shape in cross-section taken along a direction perpendicular to a longitudinal direction of the tubular portion. That is, the tubular portion includes an upper wall portion and a lower wall portion each being formed into a plate-like shape extending perpendicularly to a vehicle height direction, a front wall portion connecting front ends of the upper wall portion and the lower wall portion, and a rear wall portion connecting rear ends of the upper wall portion and the lower wall portion. The tubular portion is made of metal. The tubular portion is manufactured by, for example, an extrusion molding method. The reinforcing portion includes an upper foamed resin (thermosetting foamed resin) arranged on an inner side surface of the tubular portion to extend in the vehicle width direction along a connecting portion (upper corner portion) between the upper wall portion and the front wall portion that construct the tubular portion, a lower foamed resin (thermosetting foamed resin) arranged to extend in the vehicle width direction along a connecting portion (lower corner portion) between the lower wall portion and the front wall portion, and a support member (carrier member) configured to support the upper foamed resin and the lower foamed resin.

When an object collides with the vehicle (bumper device), a significant load is applied particularly to the upper corner portion and the lower corner portion. In the bumper device described in Japanese Patent No. 5210117, the upper corner portion and the lower corner portion are reinforced with the upper foamed resin and the lower foamed resin, respectively. Thus, flexural rigidity of the bumper device for a vehicle is enhanced, thereby increasing a shock absorbing amount.

In the bumper device for a vehicle described in Japanese Patent No. 5210117, the upper corner portion and the lower corner portion are reinforced with the foamed resins, but flexural rigidity of the foamed resins is lower than flexural rigidity of the tubular portion. Accordingly, even when the upper corner portion and the lower corner portion are reinforced with the foamed resins, the flexural rigidity of the bumper device for a vehicle is only slightly enhanced, with the result that the shock absorbing amount is only slightly increased as well.

SUMMARY

A need thus exists for a shock absorbing member which is not susceptible to the drawback mentioned above. Note that, in the following description of components of the present disclosure, for ease of understanding of the present disclosure, reference numerals corresponding to components according to an embodiment of the present disclosure are described in parentheses. However, the components of the present disclosure should not be construed as being limited to the corresponding components denoted by the reference numerals of the embodiment.

The feature of the present disclosure resides in a bumper device (10) for a vehicle, which is arranged on one of a front side and a rear side of a vehicle cabin to extend in a vehicle width direction, the bumper device (10) for a vehicle including: a tubular portion (20), which is made of metal and integrally formed so as to have a tubular shape extending in the vehicle width direction; and a reinforcing member (31), which is formed so as to have a plate-like shape extending in the vehicle width direction along an inner surface of the tubular portion, in which a foamed resin charged into the tubular portion is foamed to be increased in volume, to thereby fix the reinforcing member inside the tubular portion.

DETAILED DESCRIPTION

Figure 1:
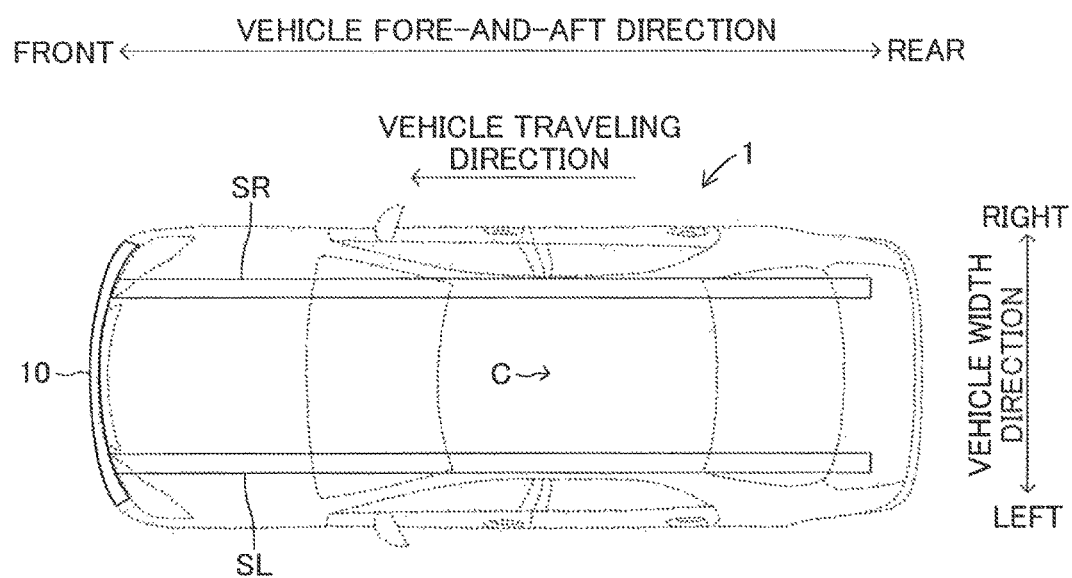
FIG. 1 is a schematic plan view of a vehicle to which a bumper device for a vehicle according to an embodiment of the present disclosure is applied.

A bumper device 10 for a vehicle according to an embodiment of the present disclosure is described. First, brief description is made of a configuration of a vehicle 1 to which the bumper device 10 for a vehicle is mounted. As illustrated in FIG. 1, the vehicle 1 includes a pair of left and right side members SL and SR. The side members SL and SR are arranged to extend in a vehicle fore-and-aft direction. The side members SL and SR are arranged at an interval in a vehicle width direction. The bumper device 10 for a vehicle is arranged to extend in the vehicle width direction, and both end portions of the bumper device 10 for a vehicle in the vehicle width direction are respectively mounted to front end surfaces of the side members SL and SR with fastening members (bolt and nut). The bumper device 10 for a vehicle is covered by a bumper cover (not shown). Note that, in this embodiment, description is made of an example of applying the present disclosure to the bumper device 10 for a vehicle, which is mounted to a front end portion of the vehicle (in front of a vehicle cabin C). However, the present disclosure is also applicable to a bumper device for a vehicle, which is mounted to a rear end portion of the vehicle (behind the vehicle cabin C).

Figure 2:
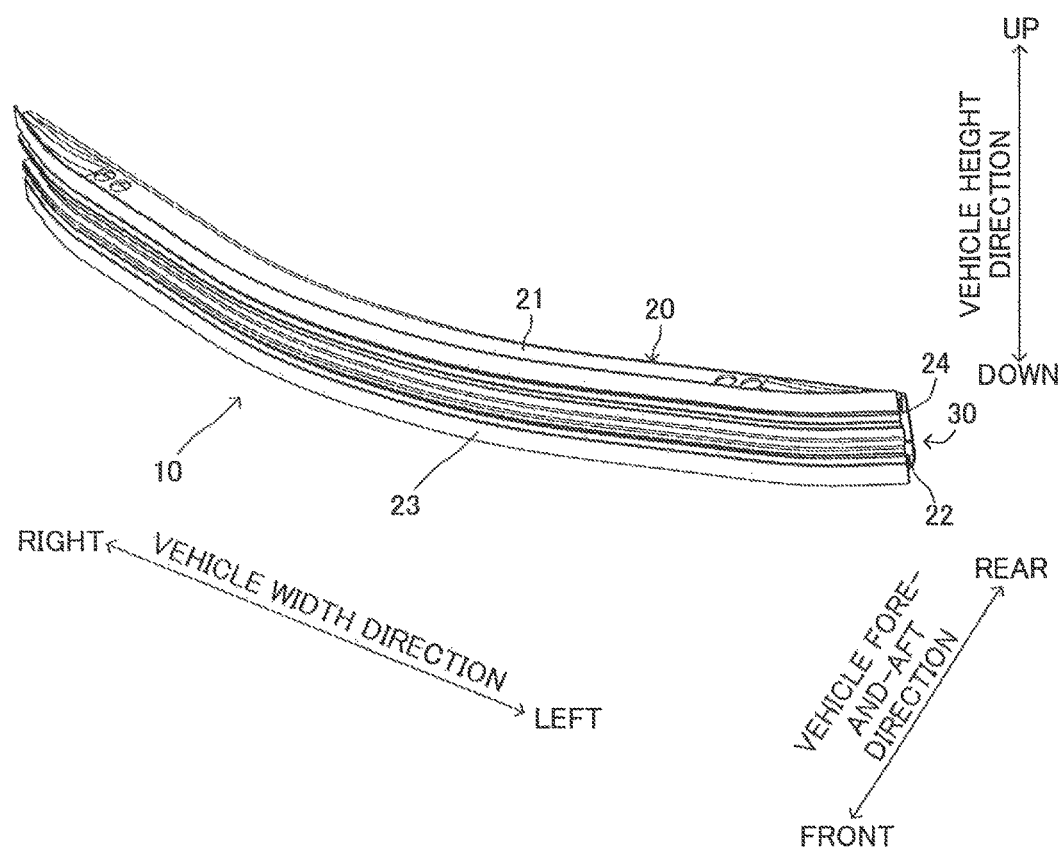
FIG. 2 is a perspective view of the bumper device for a vehicle of FIG. 1.
Figure 3:
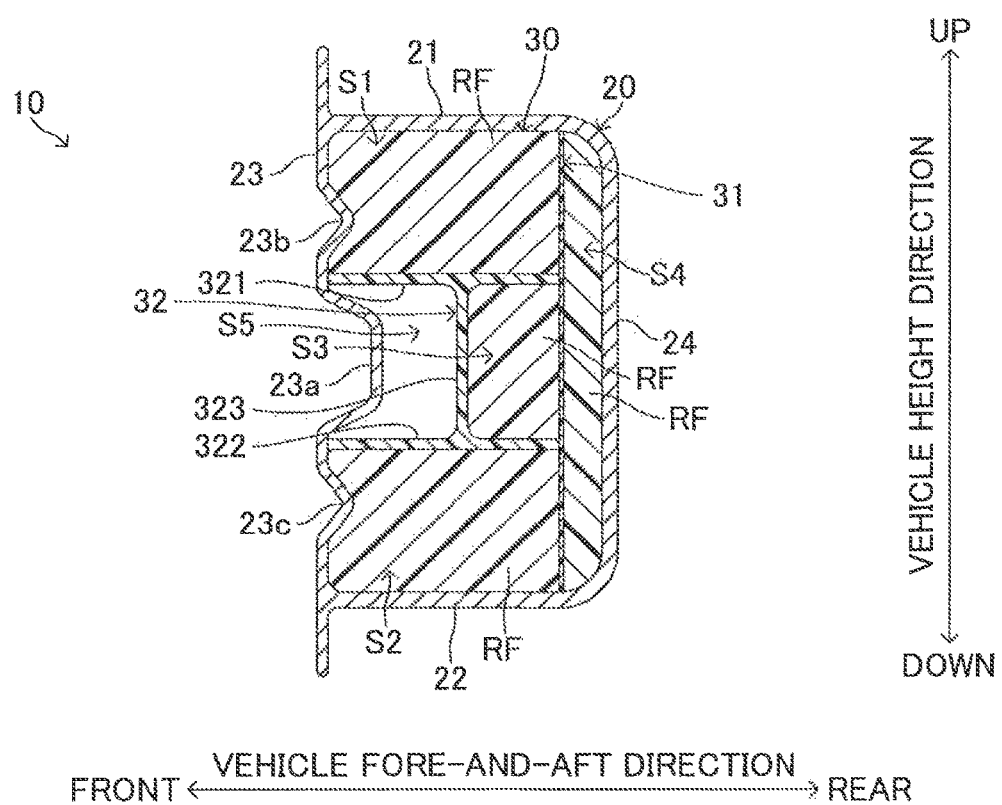
FIG. 3 is a sectional view for illustrating a cross-section of the bumper device for a vehicle of FIG. 1 taken along a direction perpendicular to a longitudinal direction of the bumper device for a vehicle.

As illustrated in FIG. 2, the bumper device 10 for a vehicle includes a tubular portion 20 and a reinforcing portion 30. The tubular portion 20 is made of metal (made of, for example, aluminum). The tubular portion 20 is formed into a tubular shape (hollow shape) extending in the vehicle width direction. As illustrated in FIG. 3, a contour of a cross-section of the tubular portion 20 has a substantially rectangular shape when taken along a direction perpendicular to a longitudinal direction of the tubular portion 20. That is, the tubular portion 20 includes an upper wall portion 21, a lower wall portion 22, a front wall portion 23, and a rear wall portion 24. The upper wall portion 21 and the lower wall portion 22 are each formed into a plate-like shape extending perpendicularly to a vehicle height direction. The lower wall portion 22 is arranged below the upper wall portion 21.

The front wall portion 23 is formed into a plate-like shape extending perpendicularly to the upper wall portion 21 and the lower wall portion 22. A front end surface of the upper wall portion 21 and a front end surface of the lower wall portion 22 are connected to a rear surface of the front wall portion 23. An upper end of the front wall portion 23 is positioned slightly above an upper surface of the upper wall portion 21. Further, a lower end of the front wall portion 23 is positioned slightly below a lower surface of the lower wall portion 22. The front wall portion 23 includes recessed portions 23a, 23b, and 23c. The recessed portions 23a, 23b, and 23c are portions formed in the front wall portion 23 so as to be recessed rearward when viewed from a front side of the tubular portion 20. The recessed portion 23a is formed in a center portion of the front wall portion 23 in the vehicle height direction to extend in the vehicle width direction. A cross-section of the recessed portion 23a has a trapezoidal shape when taken along a direction perpendicular to the extending direction of the recessed portion 23a. The recessed portions 23b and 23c are formed above and below the recessed portion 23a, respectively, to extend in the vehicle width direction. A cross-section of each of the recessed portions 23b and 23c has a V-shape when taken along a direction perpendicular to the extending direction of each of the recessed portions 23b and 23c.

The rear wall portion 24 is formed into a plate-like shape extending perpendicularly to the upper wall portion 21 and the lower wall portion 22. An upper end portion and a lower end portion of the rear wall portion 24 are curved forward and connected to a rear end surface of the upper wall portion 21 and a rear end surface of the lower wall portion 22, respectively.

The tubular portion 20 is slightly curved into a bow shape in plan view (see FIG. 1). That is, a center portion of the tubular portion 20 in the vehicle width direction is positioned forward of both end portions of the tubular portion 20 in the vehicle width direction.

The tubular portion 20 is manufactured, for example, in such a manner that a straight tubular body integrally manufactured by an extrusion molding method is bent into a bow shape. Note that, thicknesses of the upper wall portion 21, the lower wall portion 22, the front wall portion 23, and the rear wall portion 24 are, for example, 6 mm.

The reinforcing portion 30 includes a reinforcing member 31 inserted in the tubular portion 20, which is configured to reinforce the tubular portion 20, and a support member 32 configured to support the reinforcing member 31.

The reinforcing member 31 is made of a carbon-fiber-reinforced plastic. The reinforcing member 31 is arranged to extend in the vehicle width direction. The reinforcing member 31 is formed into a flat-plate-like shape extending perpendicularly to the vehicle fore-and-aft direction. A dimension of the reinforcing member 31 in the vehicle height direction is slightly smaller than an internal dimension of the tubular portion 20 in the vehicle height direction. A dimension of the reinforcing member 31 in the vehicle width direction is substantially equal to a dimension of the tubular portion 20 in the vehicle width direction. A thickness of the reinforcing member 31 is, for example, 0.5 mm. Thus, the thickness of the reinforcing member 31 is relatively small. Accordingly, when an external force is applied to the reinforcing member 31, the reinforcing member 31 can be curved slightly. In other words, the reinforcing member 31 has flexibility.

The support member 32 is made of a synthetic resin (made of, for example, a polypropylene resin). The support member 32 includes an upper wall portion 321, a lower wall portion 322, and an intermediate wall portion 323. The upper wall portion 321 and the lower wall portion 322 are each formed into a plate-like shape extending perpendicularly to the vehicle height direction. The lower wall portion 322 is positioned below the upper wall portion 321. The intermediate wall portion 323 is formed into a plate-like shape extending perpendicularly to the vehicle fore-and-aft direction. An upper end of the intermediate wall portion 323 is connected to an intermediate portion of the upper wall portion 321 in the vehicle fore-and-aft direction. Further, a lower end of the intermediate wall portion 323 is connected to an intermediate portion of the lower wall portion 322 in the vehicle fore-and-aft direction. A dimension of the support member 32 in the vehicle height direction is approximately one third of the internal dimension of the tubular portion 20 in the vehicle height direction. A dimension of the support member 32 in the vehicle width direction is substantially equal to the dimension of the tubular portion 20 in the vehicle width direction. A dimension of the support member 32 in the vehicle fore-and-aft direction is approximately 80% of an internal dimension of the tubular portion 20 in the vehicle fore-and-aft direction. A thickness of each wall portion constructing the support member 32 is, for example, 3 mm. The support member 32 is integrally formed by the extrusion molding method. The support member 32 is arranged to extend straight along the vehicle width direction, but the thickness of each wall portion constructing the support member 32 is relatively small. Accordingly, when an external force is applied to the support member 32, the support member 32 can be curved slightly. In other words, the support member 32 has flexibility.

Figure 4:
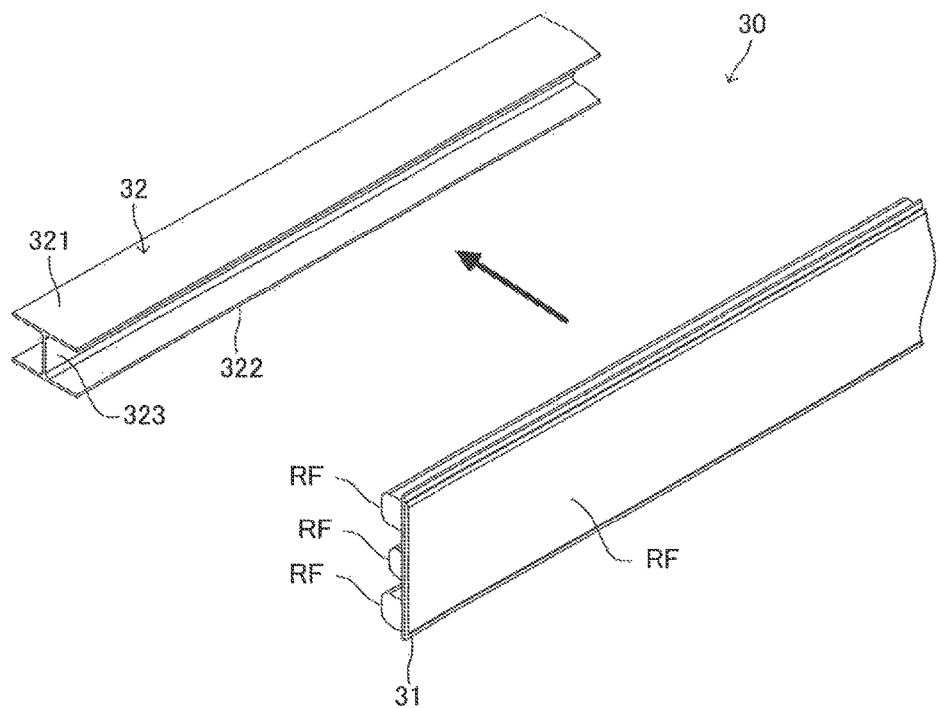
FIG. 4 is a perspective view for illustrating a procedure of assembling a reinforcing portion.

Next, a procedure of assembling the bumper device 10 for a vehicle is described. First, as illustrated in FIG. 4, thermosetting foamed resins RF are applied onto a front surface and a rear surface of the reinforcing member 31. Each thermosetting foamed resin RF is foamed by heating to be increased in volume and cured. The volume of the thermosetting foamed resin RF is increased, for example, approximately threefold. Next, the reinforcing member 31 and the support member 32 are bonded to each other. Specifically, the rear end surface of the upper wall portion 321 and the rear end surface of the lower wall portion 322 of the support member 32 are bonded to the front surface of the reinforcing member 31. The support member 32 is bonded to a center portion of the reinforcing member 31 in the vehicle height direction. That is, under a state in which the reinforcing member 31 and the support member 32 are bonded to each other, a distance between the upper surface of the upper wall portion 321 and an upper end surface of the reinforcing member 31 is equal to a distance between the lower surface of the lower wall portion 322 and a lower end surface of the reinforcing member 31. The reinforcing member 31 and the support member 32 bonded to each other are inserted into the tubular portion 20. As described above, the tubular portion 20 is slightly curved into a bow shape, whereas the reinforcing member 31 and the support member 32 are arranged to extend straight along the vehicle width direction. However, the reinforcing member 31 and the support member 32 have flexibility. Thus, when the reinforcing member 31 and the support member 32 are inserted into the tubular portion 20, the reinforcing member 31 and the support member 32 are curved along the tubular portion 20.

Under a state in which the reinforcing member 31 and the support member 32 are inserted into the tubular portion 20, a front end portion of the upper wall portion 321 is positioned between the recessed portion 23a and the recessed portion 23b (see FIG. 3). Further, a front end portion of the lower wall portion 322 is positioned between the recessed portion 23a and the recessed portion 23c. That is, the recessed portion 23a is positioned between the upper wall portion 321 and the lower wall portion 322.

When the reinforcing member 31 and the support member 32 are inserted into the tubular portion 20, an internal space of the tubular portion 20 is partitioned into five spaces (spaces S1 to S5). A space surrounded by the upper wall portion 21, the front wall portion 23, the upper wall portion 321, and the reinforcing member 31 is referred to as a space S1. A space surrounded by the lower wall portion 22, the front wall portion 23, the lower wall portion 322, and the reinforcing member 31 is referred to as a space S2. A space surrounded by the upper wall portion 321, the lower wall portion 322, the intermediate wall portion 323, and the reinforcing member 31 is referred to as a space S3. A space surrounded by the reinforcing member 31 and the rear wall portion 24 is referred to as a space S4. Further, a space surrounded by the upper wall portion 321, the lower wall portion 322, the intermediate wall portion 323, and the front wall portion 23 is referred to as a space S5. Note that, the volume of the thermosetting foamed resin RF, which is applied onto a portion of the front surface of the reinforcing member 31 positioned in each of the spaces S1, S2, and S3, is approximately one third of a volume of each of the spaces S1, S2, and S3. The volume of the thermosetting foamed resin RF, which is applied onto the rear surface of the reinforcing member 31, is approximately one third of a volume of the space S4.

Next, heating is performed on the tubular portion 20, and on the reinforcing member 31 and the support member 32 inserted into the tubular portion 20. Then, the thermosetting foamed resin RF is foamed to be increased in volume and cured. That is, the spaces S1 to S4 are charged with the thermosetting foamed resins RF. In this manner, the reinforcing member 31 is fixed inside the tubular portion 20. Note that, under this state, the space S5 remains hollow. Further, the reinforcing member 31 is arranged to extend along the rear wall portion 24. That is, the rear surface of the reinforcing member 31 and the front surface of the rear wall portion 24 are parallel and proximate to each other.

As described above, the tubular portion 20 is reinforced with the reinforcing member 31 made of the carbon-fiber-reinforced plastic. Therefore, flexural rigidity of the bumper device 10 for a vehicle can be enhanced as compared to that of the related art, thereby being capable of increasing a shock absorbing amount of the bumper device 10 for a vehicle. Further, when the reinforcing member 31 is bonded to an outer peripheral surface of the tubular portion 20, there is a high risk in that, due to a shock caused when the vehicle 1 collides with an object, the reinforcing member 31 is peeled off the tubular portion 20 to fall off. In this case, the reinforcing member 31 does not function as a member configured to reinforce the tubular portion 20. By contrast, in the bumper device 10 for a vehicle, the reinforcing member 31 is fixed inside the tubular portion 20 by the thermosetting foamed resins RF. Thus, the reinforcing member 31 reliably functions as the member configured to reinforce the tubular portion 20 without falling off the tubular portion 20.

Figure 5:
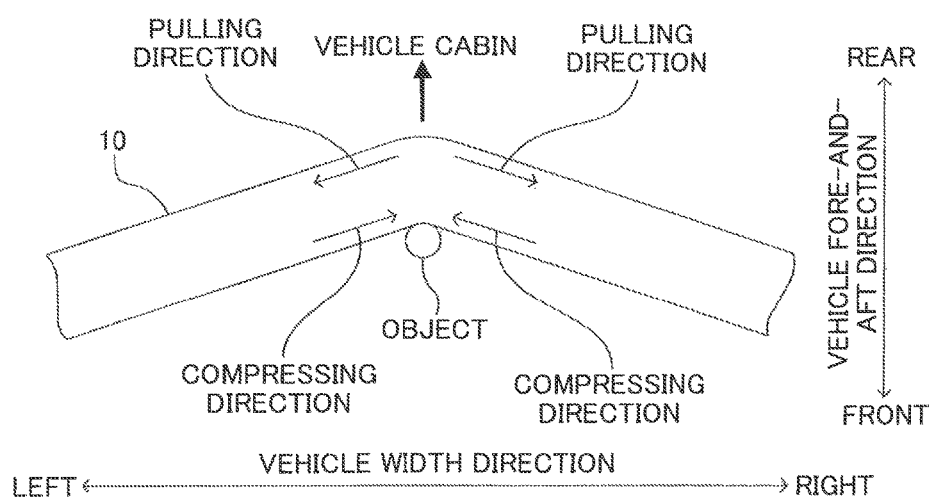
FIG. 5 is a schematic plan view for illustrating directions of forces applied to the bumper device for a vehicle when an object collides with the bumper device for a vehicle.

Further, when an object collides with a front end of the vehicle 1, as illustrated in FIG. 5, a force is applied to a front portion of the bumper device 10 for a vehicle in a compressing direction, whereas a force is applied to a rear portion of the bumper device 10 for a vehicle in a pulling direction. In general, a carbon-fiber-reinforced plastic material has high strength in the pulling direction. In this embodiment, the reinforcing member 31 is fixed along the rear wall portion 24. With this, the flexural rigidity of the bumper device 10 for a vehicle can be enhanced more effectively.

Further, the reinforcing member 31 is supported by the support member 32. Further, when the reinforcing member 31 and the support member 32 are inserted into the tubular portion 20, the space 35 defined in the tubular portion 20 remains hollow. Therefore, as compared to a case of charging all the spaces defined in the tubular portion 20 with the thermosetting foamed resins RF when the reinforcing member 31 and the support member 32 are inserted into the tubular portion 20, the bumper device 10 for a vehicle can be reduced in weight.

Further, the recessed portions 23a, 23b, and 23c extending in the longitudinal direction of the tubular portion 20 are formed in the front wall portion 23. Further, the front end portion of the upper wall portion 321 of the support member 32 is inserted between the recessed portion 23a and the recessed portion 23b, and the front end portion of the lower wall portion 322 of the support member 32 is inserted between the recessed portion 23a and the recessed portion 23c. Therefore, a position of the support member 32 in the vehicle height direction is not easily shifted.

Further, when carrying out the present disclosure, the present disclosure is not limited to the above-mentioned embodiment, and various changes may be made without departing from the object of the present disclosure.

Figure 6:
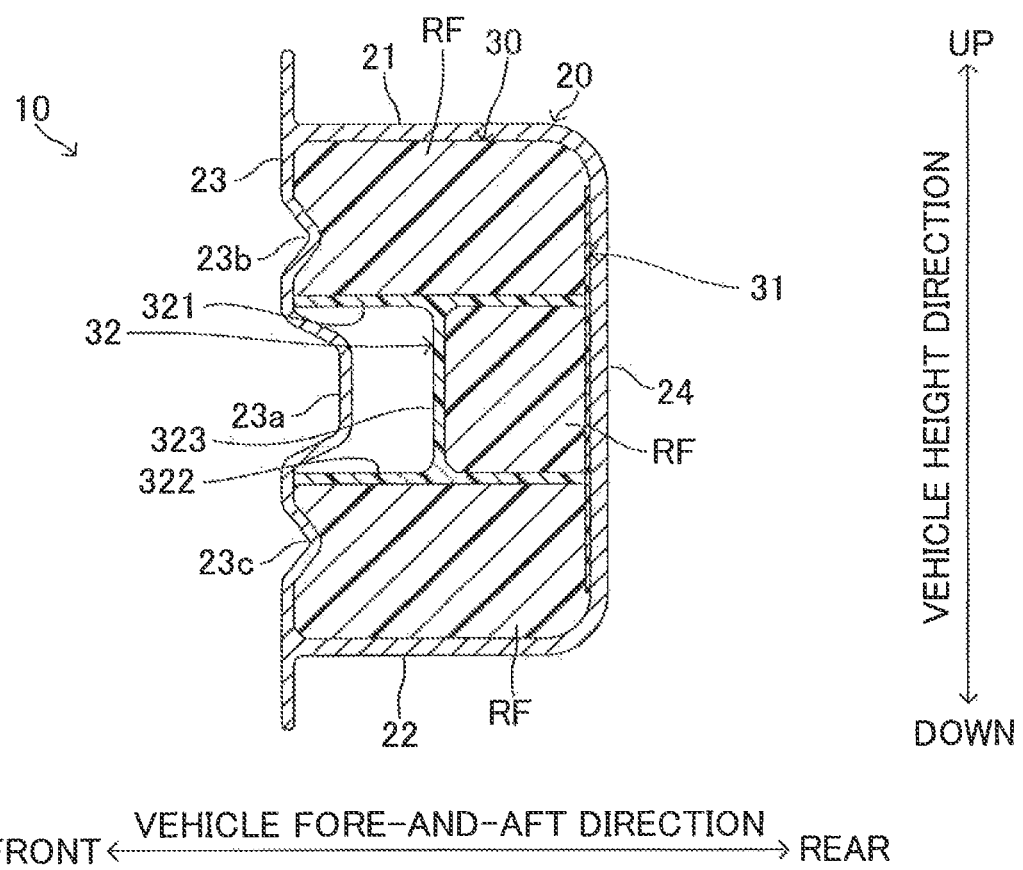
FIG. 6 is a sectional view for illustrating a cross-section of a bumper device for a vehicle according to a modified example of the present disclosure taken along a direction perpendicular to a longitudinal direction of the bumper device for a vehicle.

For example, as illustrated in FIG. 6, the rear surface of the reinforcing member 31 and the front surface of the rear wall portion 24 of the tubular portion 20 may be held in abutment on each other. Further, the support member 32 may be omitted. In this case, it is preferred that all the spaces defined in the tubular portion 20 when the reinforcing member 31 is inserted into the tubular portion 20 be charged with the thermosetting foamed resins RF without any clearance. Further, in the above-mentioned embodiment, the reinforcing member 31 is arranged along the rear wall portion 24 of the tubular portion 20. Instead of this arrangement, or in addition to this arrangement, the reinforcing member 31 may be arranged along at least one of the front wall portion 23, the upper wall portion 21, or the lower wall portion 22 of the tubular portion 20.

The feature of the present disclosure resides in a bumper device (10) for a vehicle, which is arranged on one of a front side and a rear side of a vehicle cabin to extend in a vehicle width direction, the bumper device (10) for a vehicle including: a tubular portion (20), which is made of metal and integrally formed so as to have a tubular shape extending in the vehicle width direction; and a reinforcing member (31), which is formed so as to have a plate-like shape extending in the vehicle width direction along an inner surface of the tubular portion, in which a foamed resin charged into the tubular portion is foamed to be increased in volume, to thereby fix the reinforcing member inside the tubular portion.

In this case, it is preferred that one side surface of the reinforcing member extend along the inner surface of the tubular portion, and that the foamed resin be charged between the one side surface of the reinforcing member and the inner surface of the tubular portion.

Further, in this case, one side surface of the reinforcing member may be held in abutment on the inner surface of the tubular portion.

Further, in this case, it is preferred that the reinforcing member contain a carbon-fiber-reinforced plastic.

Further, in this case, it is preferred that at least the reinforcing member be arranged in an internal space of the tubular portion.

Further, in this case, a support member configured to support the reinforcing member may be arranged in the internal space of the tubular portion in addition to the reinforcing member.

As described above, the tubular portion is reinforced with the reinforcing member. Therefore, flexural rigidity of the bumper device for a vehicle can be enhanced as compared to that of the related art, thereby being capable of increasing the shock absorbing amount of the bumper device for a vehicle. Further, when the reinforcing member is bonded to an outer peripheral surface of the tubular portion, there is a high risk in that, due to a shock caused when the vehicle collides with an object, the reinforcing member is peeled off the tubular portion to fall off. In this case, the reinforcing member does not function as a member configured to reinforce the tubular portion. By contrast, in the bumper device for a vehicle according to the present disclosure, the reinforcing member is fixed inside the tubular portion by the foamed resin. Thus, the reinforcing member reliably functions as the member configured to reinforce the tubular portion without falling off the tubular portion.

Further, another feature of the present disclosure resides in that the bumper device for a vehicle includes the reinforcing member arranged to extend along a portion of the inner surface of the tubular portion, which is positioned on the vehicle cabin side.

When the vehicle collides with an object, a force is applied in a compressing direction to a portion of the tubular portion on a side opposite to the vehicle cabin (side on which the object collides with the tubular portion), whereas a force is applied in a pulling direction to a portion of the tubular portion on the vehicle cabin side (side opposite to the side on which the object collides with the tubular portion) (see FIG. 5). In general, a carbon-fiber-reinforced plastic material has high strength in the pulling direction. Accordingly, in the present disclosure, the reinforcing member is fixed to the portion of the tubular portion on the vehicle cabin side (side opposite to the side on which the object collides with the tubular portion). With this, the flexural rigidity of the bumper device for a vehicle can be more effectively enhanced.

What is claimed is:

1. A bumper device for a vehicle, configured to be arranged on one of a front side and a rear side of a vehicle cabin to extend in a vehicle width direction, the bumper device for a vehicle comprising:
   a tubular portion, which is made of metal and integrally formed so as to have a tubular shape extending in the vehicle width direction;
   a reinforcing member, which is formed so as to have a plate-like shape extending in the vehicle width direction and perpendicular to a vehicle fore-and-aft direction, the reinforcing member being arranged to extend along a portion of an inner surface of the tubular portion, which is positioned on a vehicle cabin side, and the reinforcing member being configured to be adjacent the inner surface of the tubular portion, and
   a foamed resin in the tubular portion, the foamed resin having an expanded volume and fixing the reinforcing member inside the tubular portion.

2. A bumper device for a vehicle according to claim 1,
   wherein one side surface of the reinforcing member extends along the inner surface of the tubular portion, and
   wherein the foamed resin is between the one side surface of the reinforcing member and the inner surface of the tubular portion.

3. A bumper device for a vehicle according to claim 2, wherein the reinforcing member contains a carbon-fiber-reinforced plastic.

4. A bumper device for a vehicle according to claim 2, wherein at least the reinforcing member is arranged in an internal space of the tubular portion.

5. A bumper device for a vehicle according to claim 4, further comprising a support member configured to support the reinforcing member, the support member being arranged in the internal space of the tubular portion in addition to the reinforcing member.

6. A bumper device for a vehicle according to claim 1, wherein one side surface of the reinforcing member abuts the inner surface of the tubular portion.

7. A bumper device for a vehicle according to claim 6, wherein the reinforcing member contains a carbon-fiber-reinforced plastic.

8. A bumper device for a vehicle according to claim 6, wherein at least the reinforcing member is arranged in an internal space of the tubular portion.

9. A bumper device for a vehicle according to claim 8, further comprising a support member configured to support the reinforcing member, the support member being arranged in the internal space of the tubular portion in addition to the reinforcing member.

10. A bumper device for a vehicle according to claim 1, wherein the reinforcing member contains a carbon-fiber-reinforced plastic.

11. A bumper device for a vehicle according to claim 10, wherein at least the reinforcing member is arranged in an internal space of the tubular portion.

12. A bumper device for a vehicle according to claim 11, further comprising a support member configured to support the reinforcing member, the support member being arranged in the internal space of the tubular portion in addition to the reinforcing member.

13. A bumper device for a vehicle according to claim 1, wherein at least the reinforcing member is arranged in an internal space of the tubular portion.

14. A bumper device for a vehicle according to claim 13, further comprising a support member configured to support the reinforcing member, the support member being arranged in the internal space of the tubular portion in addition to the reinforcing member.

* * * * *